United States Patent
Kim

[11] Patent Number: 5,990,787
[45] Date of Patent: Nov. 23, 1999

[54] APPARATUS FOR WARNING LOADING EXCESS OF VEHICLE

[75] Inventor: Young-Own Kim, Kyungsangnam-do, Rep. of Korea

[73] Assignee: Hyundai Motor Company, Rep. of Korea

[21] Appl. No.: 08/932,414

[22] Filed: Sep. 17, 1997

[30] Foreign Application Priority Data

Sep. 18, 1996 [KR] Rep. of Korea ............ 96-40538

[51] Int. Cl.$^6$ ............................................. B60Q 1/00
[52] U.S. Cl. .................... 340/440; 180/290; 340/666; 340/691.3; 340/691.5
[58] Field of Search ............................. 340/440, 666, 340/686.3, 691.3, 691.4, 691.5; 250/222.1; 180/290; 177/136

[56] References Cited

U.S. PATENT DOCUMENTS 4,812,806  3/1989  Freeman .................... 340/440

Primary Examiner—Thomas Mullen
Attorney, Agent, or Firm—Christie, Parker & Hale, LLP

[57] ABSTRACT

An apparatus for warning a loading excess of vehicle includes: a motion conversion mechanism which is mounted to a lower arm rotatably mounted in a body of a vehicle, and converts a motion of the lower arm by a drooping body to a rotational motion; a rotation disc which rotates by receiving a torque from the motion conversion mechanism, and has two slit holes whose lengths are different from each other along a circumference; an overload sensing device for sensing an overload through a medium of the slit holes of the rotation disc; and an attention calling device which are operated by selectively receiving a power supply through the overload sensing device, and calls the driver's attention to the overload. The apparatus for warning the loading excess of vehicle senses an overload state through the medium of both the disc proportionally rotated according to a vehicle's load and the diodes, sequentially calls the driver's attention to the overload by using the warning lamp and the warning sound, prevents a component such as a shock absorber from being damaged, lengthens the vehicle's lifetime, lets the driver drive more safely, and thus prevents a traffic accident caused by the unreasonable driving under the loading excess state.

7 Claims, 2 Drawing Sheets

APPARATUS FOR WARNING LOADING EXCESS OF VEHICLE

BACKGROUND OF THE INVENTION

1. Field of the Invention

The present invention relates to an apparatus for warning a loading excess of vehicle. More particularly, it relates to an apparatus for warning a loading excess of vehicle which makes the driver pay attention to the loading excess by using a warning lamp and a warning sound when the vehicle excessively loads goods and passengers, thereby achieves a safety driving and prevents a component such as a suspension device from being damaged.

2. Discussion of Related Art

In general, the vehicle has a different structure according to a purpose of using. For example, a freight vehicle such as a truck has a large-sized freight compartment for loading a lot of goods, a bus has a space for taking a great number of people, and a passenger vehicle has both the space for passengers and a trunk for goods.

The load due to goods and passengers on the vehicle are supported by the wheel through the medium of axle of a vehicle body. The axle is connected to the body via the suspension device. By the suspension device, the axle does not directly transmit a vibration and impact from a road surface to the body. Accordingly, the suspension device prevents the body and goods from being damaged, and lets the passenger feel comfortable in the vehicle.

The suspension device includes: a chassis spring for lowering an impact from a road surface; a shock absorber for making a comfortable passenger by controlling a free vibration of the chassis spring; and a stabilizer for preventing a vehicle's rolling.

Herein, the shock absorber absorbs a natural vibration generated by the impact which is applied to the spring while driving the vehicle, rapidly reduces the vibration, thereby enhancing a comfortable feeling of the passenger. In addition, the shock absorber prevents a vehicle body from leaning to one side in turning the vehicle, and maintains a vehicle balance in cooperation with a stabilizer bar.

However, the shock absorber may be broken by a fatigue accumulation, its shape may be changed by a strong shock due to overloading or overload caused by driver's carelessness, or it may be broken, through oil leakage. As described above, if the shock absorber is broken, it deals the vehicle a fatal blow.

Since a conventional system does not include an apparatus for warning vehicle overloading to the driver, the shock absorber may break quickly, thereby shortening the vehicle's lifetime. Furthermore, since a rear body is sagged during the night driving, irradiation angle of a headlight becomes higher. As a result, it may disturb another driver of the facing vehicle which runs the opposite direction, lowers a safety of driving, and thereby causes a traffic accident.

SUMMARY OF THE INVENTION

Accordingly, the present invention is directed to an apparatus for warning a loading excess of vehicle that substantially obviates one or more of the problems due to limitations and disadvantages of the related art.

An objective of the present invention is to provide an apparatus for warning a loading excess of vehicle which makes the driver pay attention to the loading excess by using a warning lamp and a warning sound when a vehicle excessively loads goods and passengers, prevents a component such as a suspension device from being damaged, lengthens the vehicle's lifetime, lets the driver drive more safely, and thus lowers a possibility of traffic accident.

To achieve these and other advantages and in accordance with the purpose of the present invention, as embodied and broadly described, the present invention includes:

a motion conversion means which is mounted to a lower arm rotatably mounted in a body of a vehicle, and converts a motion of the lower arm by a drooping body to a rotational motion;

a rotation disc which rotates by receiving a torque from the motion conversion means, and has two slit holes whose lengths are different from each other along a circumference;

an overload sensing means for sensing an overload through a medium of the slit holes of the rotation disc; and an attention calling means which are operated by selectively receiving a power supply through the overload sensing means, and calls the driver's attention to the overload.

It is to be understood that both the foregoing general description and the following detailed description are exemplary and explanatory and are intended to provide further explanation of the invention as claimed.

BRIEF DESCRIPTION OF THE ATTACHED DRAWINGS

The accompanying drawings, which are included to provide a further understanding of the invention and are incorporated in and constitute a part of this specification, illustrate embodiments of the invention and together with the description serve to explain the principles of the drawings:

DETAILED DESCRIPTION OF THE INVENTION

Figure 1:
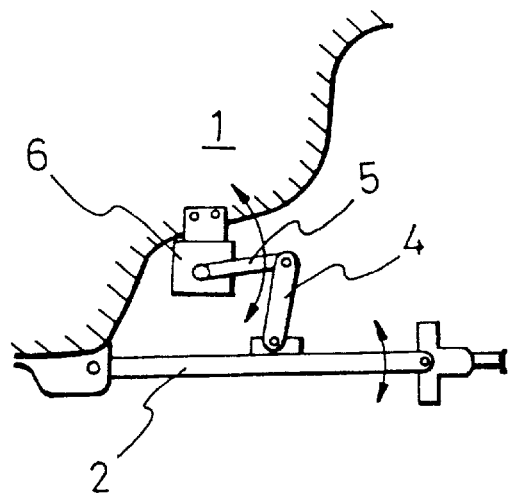
FIG. 1 depicts an apparatus for warning a loading excess of vehicle in accordance with the present invention.
Figure 2:
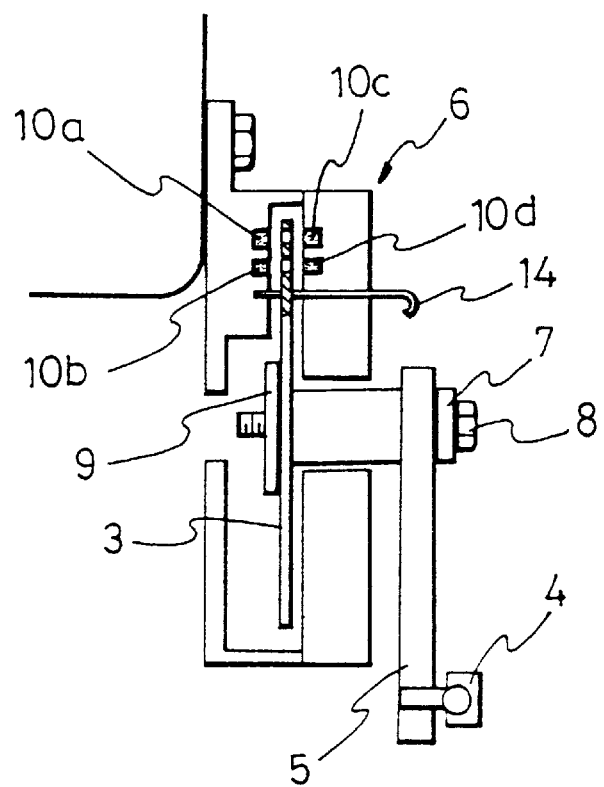
FIG. 2 is a cross-sectional view illustrating an apparatus for warning a loading excess of vehicle in accordance with the present invention.
Figure 3:
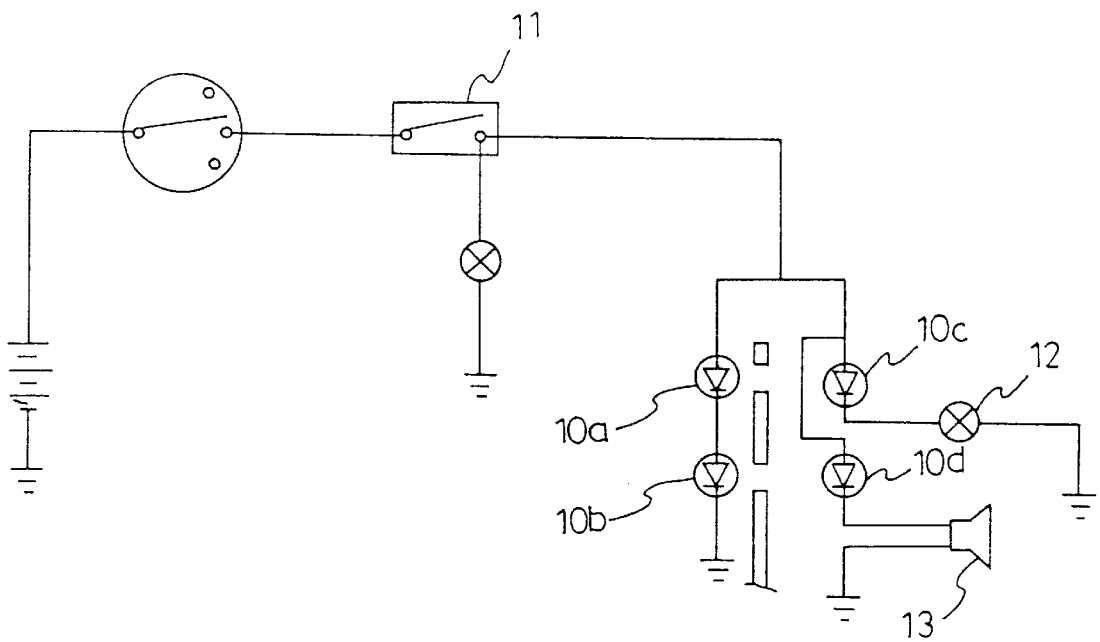
FIG. 3 is a circuit diagram illustrating an apparatus for warning a loading capacity excess of vehicle in accordance with the present invention.

Reference will now be made in detail to the preferred embodiments of the present invention, examples of which are illustrated in the accompanying drawings.

Referring to FIGS. 1 to 4, a lower arm 2 is rotatably mounted to the body 1. The motion conversion means converts a motion of the lower arm 2 by a drooping of the body 1 to a rotational motion.

The rotation disc 3 which rotates by receiving a torque from the motion conversion means, has two slit holes 3a and 3b along a circumference, therein, which slit holes have a different length.

The present invention includes an overload sensing means for sensing an overload through a medium of the slit holes 3a and 3b of the rotation disc 3, and an attention calling means which are operated by selectively receiving a power supply through the overload sensing means and thereby calls the driver's attention to the overload.

The motion conversion means will now be more specifically described. One end of a first link 4 is mounted to a central part in a length direction of the lower arm 2. Other end of the first link 4 is rotatably connected to one end of a second link 5 with a pin. A rotation shaft 7 is received in a housing 6 mounted to the body 1, and is partially projected to outside of the housing 6. Other end of the second link 5 is connected to the rotation shaft 7 as one body. Accordingly, the motion of the lower arm 2 is converted to a rotational motion of the rotation shaft 7 through two links 4 and 5.

The rotation disc 3 is received in the housing 6, and is connected to the rotation shaft 7 with a bolt 8 and a washer nut 9. The rotation disc 3 is mounted to be rotated with the rotation shaft 7. A starting angular position of a slit hole 3a is the same as the slit hole 3b, but the ending angular position of the slit hole 3a is different from that of the slit hole 3b. As a result, the circumferential angles of two slit holes 3a and 3b are different from each other.

As to the overload sensing means, two light emitting diodes 10a and 10b are vertically mounted to be opposite to two light receiving diodes 10c and 10d at a predetermined distance, on both inner walls of the housing 6 adjacent to the disc 3. The light emitting diodes 10a and 10b and the light receiving diodes 10c and 10d are connected in parallel with a parking contact switch 11 connected to a battery power, so that the light emitting diodes 10a and 10b receive a power supply only when the parking contact switch is 11 is turned on.

The attention calling means includes a warning lamp 12 and a warning device 13 which are respectively connected to the light emitting diodes 10c and 10d, thereby being selectively lit or generating a warning sound.

In order to set a standard position of the disc 3, when the disc 3 is mounted to, the housing 6, within a tolerance, a standard hole 3c is formed in the disc 3 so as to let a fixed pin 14 penetrate both the housing 6 and the disc 3.

As to the installation method of the rotation disc 3, the fixed pin 14 penetrates the housing 6 and the disc 3 in the tolerance, and prevents the disc 3 from rotating. The rotation shaft 7 is inserted into the disc 3, so that the rotation shaft 7 and the disc 3 are connected as one body through the medium of the bolt 8 and the nut 9. The links 4 and 5 connected to the rotation shaft 7 is mounted to the lower arm 2, and a standard position of the disc 3 is then determined in the tolerance state.

Operations and effects of the present invention will now be described below.

If a parking brake is locked when the vehicle is parked, a parking contact switch 11 is turned on so that the light emitting diodes 10a and 10b and the light receiving diodes 10c and 10d receive the power supply through the parking contact switch 11.

Under this condition, if the vehicle takes passengers or goods, the body 1 is sagged, the lower arm 2 is moved toward a counterclockwise direction, and thus the first link 4 is pushed up. As a result, the second link 5 is moved toward the counterclockwise direction through the first link 4, so that the rotation shaft 7 and the disc 3 are rotated as one body in a counterclockwise direction.

Herein, a rotating degree of the disc 3 is varied according to the load of vehicle. That is, as the number of passengers and a loading quantity of goods become increased, the rotating degree of the disc 3 proportionally increases.

Figure 4:
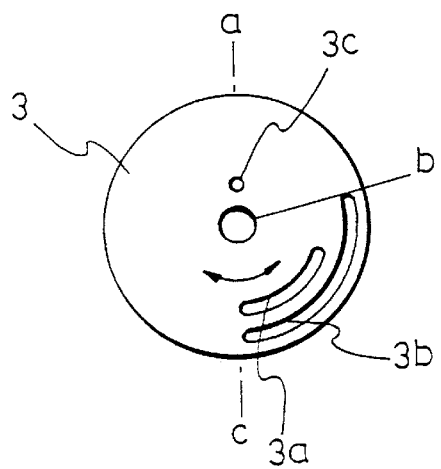
FIG. 4 is a front view illustrating a disc in accordance with the present invention.

As shown in FIG. 4, a proper load is loaded to the vehicle in an interval a~b having a lower rotating degree, an excess load is loaded to the vehicle in an interval b~c having a large rotating degree.

Accordingly, if the vehicle excessively loads passengers or goods, the rotating degree of the disc 3 increases so the slit holes 3a and 3b of the disc 3 are rotated to a position of the diodes. If the first slit hole 3a, one end having a large circumferential angle is arranged to the same position as the first light emitting diode 10a, the light from the first light emitting diode 10a is sensed by the light receiving diode 10c via the slit hole 3a. The light receiving diode 10c is turned on by the light from the first light emitting diode 10a, the battery power is applied to the warning lamp 12 via both the parking contact switch 11 and the first light receiving diode 10c, and thus the warning lamp 12 is turned on, thereby calling the driver's attention to this fact.

If the number of passengers and the quantity of goods increases, the rotating degree of the disc 3 becomes wider. Accordingly, under the first slit hole 3a allows the first light emitting diode 10a to be in continual communication with the first light receiving diode 10c, the second slit hole 3b is arranged to the same position as the diodes 10b and 10d. Therefore, the light from the second light emitting diode 10b is sensed by the second light receiving diode 10d via the second slit hole 3b. The second light receiving diode 10d is turned on, the battery power is applied to the warning device 13 via both the parking contact switch 11 and the first light receiving diode 10d, and thus the warning device 13 is simultaneously operated under the warning lamp 12 is turned on, thereby calling again the driver's attention to this fact.

The warning lamp and the warning sound are sequentially operated according to the load of the vehicle, and thus call the driver's attention to the overload. Accordingly, the driver easily notices overload of vehicle through the warning lamp and the warning sound. The present invention prevents the driver from driving unreasonably under the loading excess state which could break a vehicle's component such as a shock absorber, extends a lifetime of the vehicle, and prevents a traffic accident due to the unreasonable driving.

As described above, the apparatus for warning the loading excess of vehicle senses an overload state through the medium of both the disc proportionally rotated according to a vehicle's load and the diodes, sequentially calls the driver's attention to the loading excess state by using the warning lamp and the warning sound, prevents a component such as a shock absorber from being damaged, lengthens the vehicle's lifetime, lets the driver drive more safely, and thus prevents a traffic accident caused by the unreasonable driving under the loading excess state.

It will be apparent to those skilled in the art that various modifications and variations can be made in the apparatus for warning the loading excess of vehicle of the present invention without departing from the spirit or scope of the invention. Thus, it is intended that the present invention cover the modifications and variations of this invention provided they come within the scope of the appended claims and their equivalents.

What is claimed is:

1. An apparatus for warning of an excess loading on vehicle comprising:

a lower arm rotatably mounted on a body of such vehicle;

a motion conversion means which is mounted to the lower arm and converts a motion of said lower arm, in response to drooping of the body, to a rotational motion;

a rotation disc which rotates by receiving a torque from said motion conversion means, and has two slit holes whose lengths are different from each other along a circumference;

an overload sensing means for sensing an overload through a medium of said slit holes of said rotation disc; and an attention calling means which are operated by selectively receiving a power supply through said overload sensing means, and calls a driver's attention to said overload.

2. The apparatus as set forth in claim 1 wherein, said motion conversion means comprises a first link and a second link, and one end of said first link is mounted to a central part in a lengthwise direction of said lower arm, other end of said first link is rotatably connected to one end of said second link with a pin, and other end of said second link is connected to a rotation shaft received in a housing mounted to said body with a bolt and partially projecting out of said housing.

3. The apparatus as set forth in claim 1 wherein, said rotation disc is received in a housing, is connected to a rotation shaft with a bolt and a washer nut, and is thus mounted to said rotation shaft as one body.

4. The apparatus as set forth in claim 1 wherein, a starting angular position of said first slit hole is the same as said second slit hole, but an ending annular position of said first slit hole is different from that of said second slit hole.

5. The apparatus as set forth in claim 1 wherein, said overload sensing means comprises two light emitting diodes and two light receiving diodes, and said two light emitting diodes are vertically mounted to be opposite to said two light receiving diodes at a predetermined distance on both inner walls of a housing adjacent to said rotation disc, and said two light emitting diodes and said two light receiving diodes are connected in parallel to each other and in series with a parking contact switch connected to a battery power.

6. The apparatus as set forth in claim 5 wherein, said attention calling means includes a warning lamp and a warning device which are respectively connected to said light receiving diodes, thereby being selectively lit or generating a warning sound.

7. The apparatus as set forth in claim 1 wherein, in order to set a standard position of said rotation disc when mounting said rotation disc to a housing within a tolerance, a standard hole is formed in said rotation disc so as to let a fixed pin penetrate both said housing and said rotation disc.

* * * * *